(12) United States Patent
Messer

(10) Patent No.: US 11,574,469 B2
(45) Date of Patent: Feb. 7, 2023

(54) COMPUTE SYSTEM WITH WEAR DETECTION MECHANISM AND METHOD OF OPERATION THEREOF

(71) Applicant: MOJ.IO, Inc., Vancouver (CA)

(72) Inventor: Alan Messer, Los Gatos, CA (US)

(73) Assignee: MOJ.IO, Inc., Vancouver (CA)

(*) Notice: Subject to any disclaimer, the term of this patent is extended or adjusted under 35 U.S.C. 154(b) by 0 days.

(21) Appl. No.: 16/876,996

(22) Filed: May 18, 2020

(65) Prior Publication Data

US 2021/0357645 A1 Nov. 18, 2021

(51) Int. Cl.
*G06K 9/00* (2022.01)
*G06V 20/20* (2022.01)
*G06K 9/62* (2022.01)
*G06V 10/44* (2022.01)
*G06N 20/00* (2019.01)

(52) U.S. Cl.
CPC .............. *G06V 20/20* (2022.01); *G06K 9/628* (2013.01); *G06V 10/44* (2022.01); *G06N 20/00* (2019.01)

(58) Field of Classification Search
CPC ... G01M 17/02–028; B60C 11/24–246; G06K 9/4604; G06K 9/628; G06V 20/20; G06V 10/44; G06V 10/242; G06V 20/00; G06N 20/00; G06T 7/0004

USPC ................... 382/100, 108, 141, 152
See application file for complete search history.

(56) References Cited

U.S. PATENT DOCUMENTS

| 9,805,697 | B1* | 10/2017 | Dorrance | B60C 99/006 |
| 10,102,616 | B2 | 10/2018 | Miller et al. | |
| 10,295,333 | B2 | 5/2019 | Fish et al. | |
| 2014/0240349 | A1 | 8/2014 | Tuukkanen | |
| 2016/0258842 | A1* | 9/2016 | Taylor | G01B 11/22 |
| 2016/0343126 | A1* | 11/2016 | Miller | G01B 11/22 |
| 2017/0190223 | A1* | 7/2017 | Fish | H04N 7/18 |
| 2017/0349007 | A1* | 12/2017 | Wei | G01B 11/22 |
| 2019/0164363 | A1* | 5/2019 | Javid | G07C 5/0808 |
| 2020/0079381 | A1* | 3/2020 | Lombrozo | G05D 1/0276 |
| 2020/0130420 | A1* | 4/2020 | Puranik | G01M 17/027 |
| 2021/0138851 | A1* | 5/2021 | Tompkins | B60C 99/006 |

* cited by examiner

*Primary Examiner* — Andrew M Moyer
(74) *Attorney, Agent, or Firm* — Perspectives Law Group, Corp.

(57) ABSTRACT

A method of operation of a compute system includes: capturing an image of a surface of a tire; identifying a tire wear in the image; categorizing the tire wear as a bald region, a crack, a foreign object, low tread, or a combination thereof; generating a wear report includes identifying the tire wear as the bald region, the crack, the foreign object, low tread, or the combination thereof; and transferring the wear report for displaying on a display.

20 Claims, 7 Drawing Sheets

COMPUTE SYSTEM WITH WEAR DETECTION MECHANISM AND METHOD OF OPERATION THEREOF

TECHNICAL FIELD

An embodiment of the present invention relates generally to a compute system, and more particularly to a system with a tire wear detection mechanism.

BACKGROUND

Modern civilization requires people to travel to work, to school, to the grocery, out for entertainment, and much more. Most people prefer having their own vehicle to accommodate their needs. Our travel plans can be interrupted by problems with our vehicles. As we use our vehicles, wear of key components can make the vehicle unreliable or leave us stranded at the side of the road. The most common of these is the wear to consumable parts such as batteries, tires, oil, or the like. Some of these component failures can be predicted, but other can be an unwelcome surprise. Drivers need a system that allows them to understand how the wear, of the consumable parts, can indicate the condition of their vehicle before they are left on the side of the road.

Thus, a need still remains for a compute system with a wear detection mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have long been sought but prior developments have not taught or suggested any solutions and, thus, solutions to these problems have long eluded those skilled in the art.

SUMMARY

An embodiment of the present invention provides a method of operation of a compute system including: capturing an image of a surface of a tire; identifying a tire wear pattern in the image; categorizing the tire wear as a bald region, a crack, a foreign object, low tread, or a combination thereof; generating a wear report includes identifying the tire wear as the bald region, the crack, the foreign object, low tread, or the combination thereof; and displaying the wear report on a display.

An embodiment of the present invention provides a compute system, including: a control circuit configured to: capture an image of a surface of a tire, identify a tire wear in the image, categorize the tire wear as a bald region, a crack, a foreign object, low tread, or a combination thereof, and generate a wear report to identify the tire wear as the bald region, the crack, the foreign object, low tread, or the combination thereof; and a communication circuit, coupled to the control circuit, configured to transfer the wear report for presentation on a display An embodiment of the present invention provides a non-transitory computer readable medium including instructions for a compute system, including: capturing an image of a surface of a tire; identifying a tire wear in the image; categorizing the tire wear as a bald region, a crack, a foreign object, low tread, or a combination thereof; generating a wear report includes identifying the tire wear as the bald region, the crack, the foreign object, low tread, or the combination thereof; and displaying the wear report on a display.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
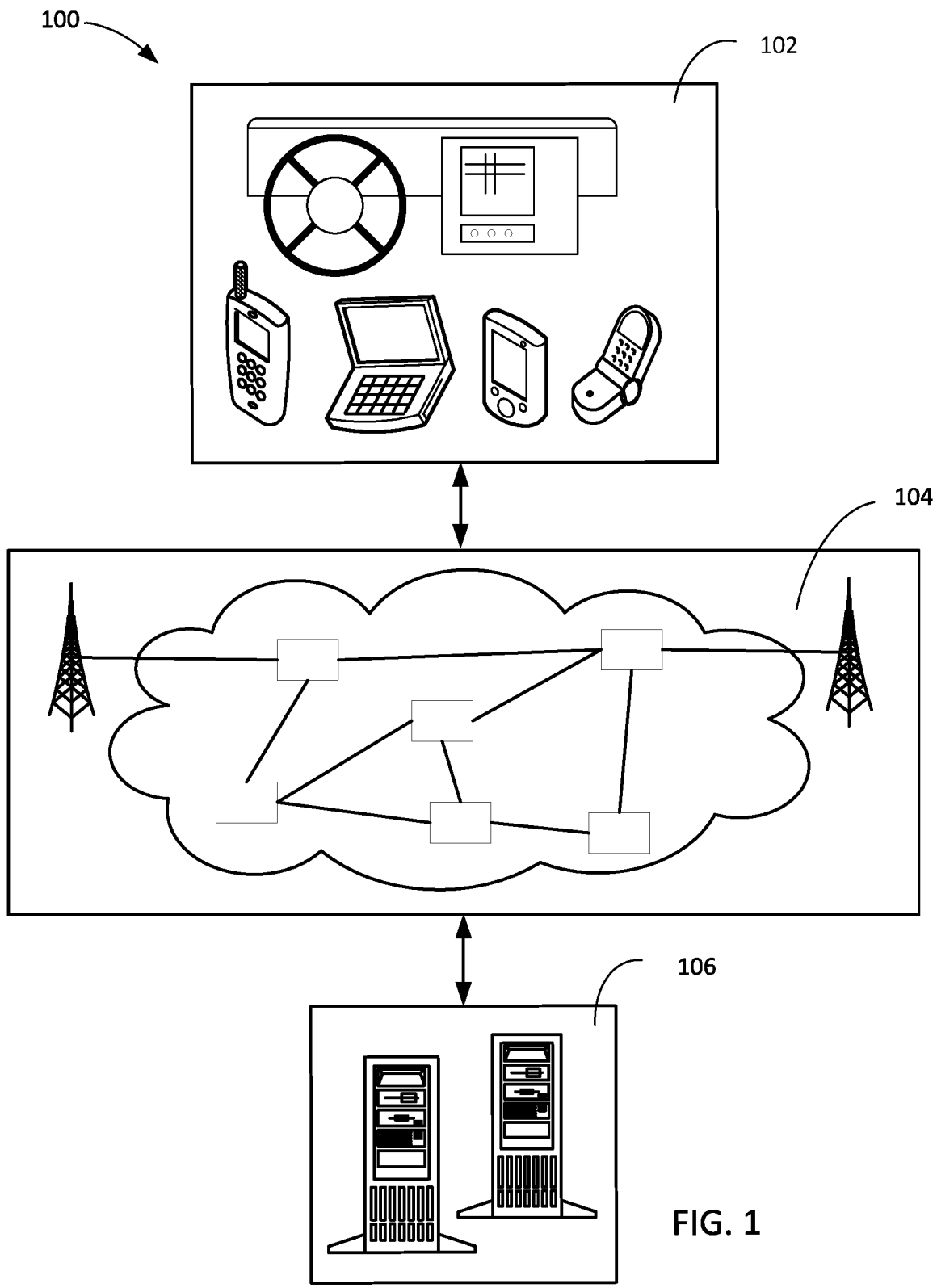
FIG. 1 is a compute system with a wear detection mechanism in an embodiment of the present invention.

Embodiments provide a compute system that determine wear characteristics of a tire using a camera. As a specific example, the compute system can use a smartphone camera with artificial intelligence (AI) to examine features of an image of the tire on the vehicle. Using the AI to recognize a variety of features across different types of tire wear, in order to recognize tire wear in different parts of the tread pattern within field of view. Combining these factors to give an indication/recommendation of the wear level of the tire and possible actions to rectify the situation.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention can be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention. The terms first, second, etc. can be used throughout as part of element names and are used as a matter of descriptive convenience and are not intended to have any other significance or provide limitations for an embodiment.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Referring now to FIG. 1, therein is shown a compute system 100 with a wear detection mechanism in an embodiment of the present invention. The compute system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of devices, such as a vehicle, a telematics system in a vehicle, a computing device, a cellular phone, a tablet computer, a smart phone, a notebook computer, vehicle embedded navigation system, or a dongle or device that plugs into a vehicle. The first device 102 can couple, either directly or indirectly, to the communication path 104 to communicate with the second device 106 or can be a stand-alone device.

The second device 106 can be any of a variety of centralized or decentralized computing devices, sensor devices to take measurements or record environmental information, such as sensor instruments, sensor equipment, or a sensor array. For example, the second device 106 can be a multimedia computer, a laptop computer, a desktop computer, grid-computing resources, a virtualized computer resource, cloud computing resource, routers, switches, peer-to-peer distributed computing devices, a vehicle, or a combination thereof.

The second device 106 can be mounted externally or internally to a vehicle, centralized in a single room or within a vehicle, distributed across different rooms, distributed across different geographical locations, embedded within a telecommunications network. The second device 106 can couple with the communication path 104 to communicate with the first device 102.

For illustrative purposes, the compute system 100 is described with the second device 106 as a computing device, although it is understood that the second device 106 can be different types of devices, such as a standalone sensor or measurement device. Also for illustrative purposes, the compute system 100 is shown with the second device 106 and the first device 102 as end points of the communication path 104, although it is understood that the compute system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
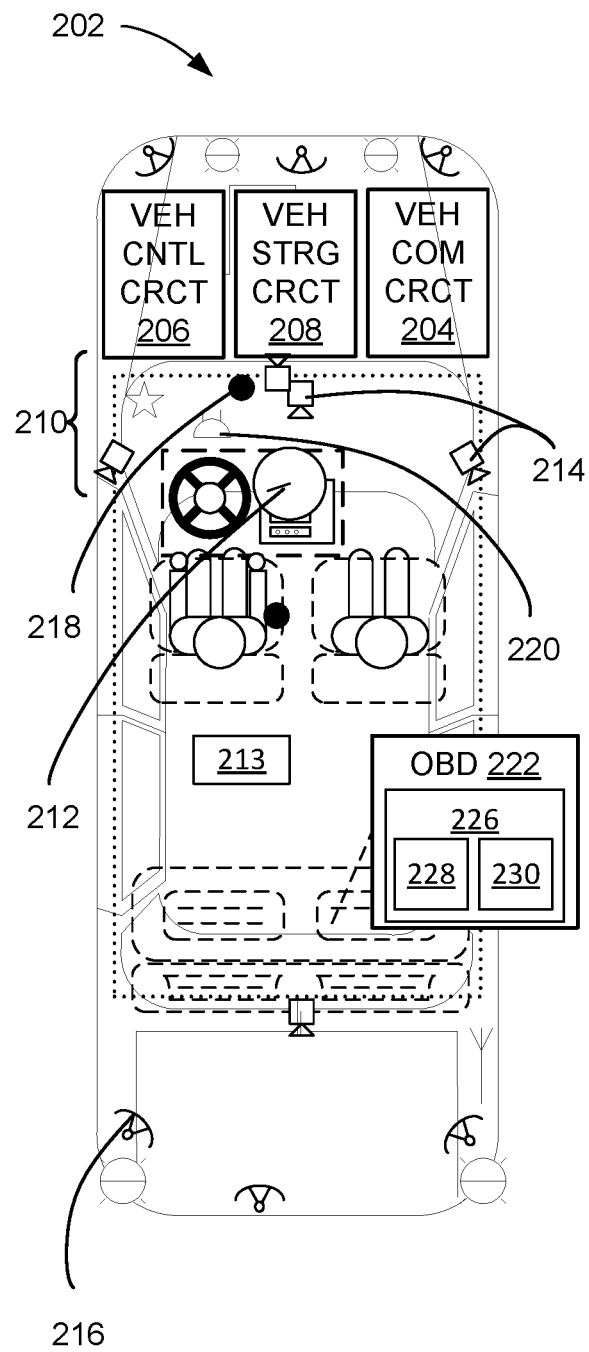
FIG. 2 is an example a top plan view of a vehicle for the compute system.

Referring now to FIG. 2, therein is shown an example a top plan view of a vehicle 202 for the compute system 100 of FIG. 1. As an example, the compute system 100 can include or interact with the first device 102 of FIG. 1 as the vehicle 202. The vehicle 202 can also include one or more of environmental sensors 210. The vehicle 202 is an object or a machine used for transporting people or goods.

The vehicle 202 can include or represent different types of vehicles. For example, the vehicle 202 can be an electric vehicle, a combustion vehicle, or a hybrid vehicle. Also, for example, the vehicle 202 can be an autonomous vehicle or a non-autonomous vehicle. As a specific example, the vehicle 202 can include a car, a truck, a cart, a motorcycle, or a combination thereof.

The vehicle 202 can include a device, a circuit, one or more specific sensors, or a combination thereof for providing assistance or additional information to control, maneuver, or operate the vehicle 202. The vehicle 202 can include a vehicle communication circuit 204, a vehicle control circuit 206, a vehicle storage circuit 208, other interfaces, or a combination thereof.

The vehicle 202 can also include on-board diagnostics 222 (OBD) that can be accessed by the vehicle control circuit 206. As an example, the vehicle control circuit 206 can access the on-board diagnostics 222 with the vehicle communication circuit 204. The vehicle 202 can store and retrieve the on-board diagnostics 222 to and from the vehicle storage circuit 208.

The on-board diagnostics 222 represent information about the vehicle 202. For example, the on-board diagnostics 222 can provide status or the state of the vehicle 202 or a portion thereof. The on-board diagnostics can provide an estimation of useable life of the engine oil in the crank case. The remaining oil life can address one of the consumables that can impact the reliability of the vehicle 202.

The vehicle storage circuit 208 can include a functional unit or circuit integral to the vehicle 202 and configured to store and recall information. The vehicle storage circuit 208 can be a volatile memory, a nonvolatile memory, an internal memory, an external memory, or a combination thereof. For example, the vehicle storage circuit 208 can be a nonvolatile storage such as non-volatile random access memory (NVRAM), Flash memory, disk storage, or a volatile storage such as static random access memory (SRAM).

The vehicle storage circuit 208 can store vehicle software, other relevant data, such as input information, information from sensors, processing results, information predetermined or preloaded by the compute system 100 or vehicle manufacturer, or a combination thereof. The vehicle storage circuit 208 can store the information for the on-board diagnostics 222.

The vehicle control circuit 206 can include a function unit or circuit integral to the vehicle 202 and configured to execute or implement instructions. The vehicle control circuit 206 can execute or implement the vehicle software to provide the intelligence of the vehicle 202, the compute system 100, or a combination thereof. The vehicle control circuit 206 can respond to requests for the on-board diagnostics 222. The request can be from other parts of the vehicle 202, the compute system 100, or a combination thereof or external to the compute system 100.

The vehicle control circuit 206 can be implemented in a number of different manners. For example, the vehicle control circuit 206 can be a processor, an application specific integrated circuit (ASIC) an embedded processor, a microprocessor, a hardware control logic, a hardware finite state machine (FSM), a digital signal processor (DSP), or a combination thereof. As a more specific example, the vehicle control circuit 206 can include an engine control unit, one or more central processing unit, or a combination thereof The vehicle communication circuit 204 can include a function unit or circuit integral to the vehicle 202 and configured to enable external communication to and from the vehicle 202. For example, the vehicle communication circuit 204 can permit the vehicle 202 to communicate with the first device 102, the second device 106 of FIG. 1, the communication path 104 of FIG. 1, or a combination thereof. The vehicle communication circuit 204 can provide the on-board diagnostics 222 to other portions of the vehicle 202, the compute system 100, or a combination thereof or external to the compute system 100.

The vehicle communication circuit 204 can also function as a communication hub allowing the vehicle 202 to function as part of the communication path 104 and not limited to be an end point or terminal circuit to the communication path 104. The vehicle communication circuit 204 can include active and passive components, such as microelectronics or an antenna, for interaction with the communication path 104. For example, the vehicle communication circuit 204 can include a modem, a transmitter, a receiver, a port, a connector, or a combination thereof for wired communication, wireless communication, or a combination thereof.

The vehicle communication circuit 204 can couple with the communication path 104 to send or receive information directly between the vehicle communication circuit 204 and the first device 102, the second device 106, or a combination thereof as endpoints of the communication, such as for direct line-of-sight communication or peer-to-peer communication. The vehicle communication circuit 204 can further couple with the communication path 104 to send or receive information through a server or another intermediate device in between endpoints of the communication.

The vehicle 202 can further include various interfaces. The vehicle 202 can include one or more interfaces for interaction or internal communication between functional units or circuits of the vehicle 202. For example, the vehicle 202 can include one or more interfaces, such as drivers, firmware, wire connections or buses, protocols, or a combination thereof, for the vehicle storage circuit 208, the vehicle control circuit 206, or a combination thereof.

The vehicle 202 can further include one or more interfaces for interaction with an occupant, an operator or a driver, a passenger, or a combination thereof relative to the vehicle 202. For example, the vehicle 202 can include a user interface including input or output devices or circuits, such as a screen or touch screen, a speaker, a microphone, a keyboard or other input devices, an instrument panel, or a combination thereof.

The vehicle 202 can further include one or more interfaces along with switches or actuators for physically controlling movable components of the vehicle 202. For example, the vehicle 202 can include the one or more interfaces along with the controlling mechanisms to physically perform and control the maneuvering of the vehicle 202, such as for automatic driving or maneuvering features.

The functional units or circuits in the vehicle 202 can work individually and independently of the other functional units or circuits. The vehicle 202 can work individually and independently from the first device 102, the communication path 104, the second device 106, other devices or vehicles, or a combination thereof.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

The environmental sensors 210 are each a device for detecting or identifying environment of the vehicle 202. The environmental sensors 210 can detect, identify, determine, or a combination thereof for the vehicle 202 itself, such as for status or movement thereof. The environmental sensors 210 can detect, identify, determine, or a combination thereof for environment within a cabin of the vehicle 202, an environment external to and surrounding the vehicle 202, or a combination thereof. The feedback from the environmental sensors 210 can be presented on a vehicle display 212. The vehicle display 212 can be a liquid crystal display (LCD), a cathode ray tube (CRT), or the like, capable of displaying the information from the environmental sensors 210 or feedback from the wear detection mechanism, described later.

For example, the environmental sensors 210 can include a location-movement sensor 213, a visual sensor 214, a radar sensor 216, an accessory sensor 218, a volume sensor 220, or a combination thereof. The location-movement sensor 213 can identify or calculate a geographic location of the vehicle 202, determine a movement of the vehicle 202, or a combination thereof. Examples of the location-movement sensor 213 can include an accelerometer, a speedometer, a GPS receiver or device, a gyroscope or a compass, or a combination thereof. The vehicle 202 can include the environmental sensors 210 other than or in addition to the location-movement sensor 213, such as thermal sensor. The thermal sensor can capture and provide temperature readings for portions of the vehicle 202. The thermal sensor can also capture and provide temperature readings external to the vehicle 202.

The visual sensor 214 can include a sensor for detecting or determining visual information representing the environment external to and surrounding the vehicle 202. The visual sensor 214 can include a camera attached to or integral with the vehicle 202. For example, the visual sensor 214 can include a camera, such as a forward-facing camera, a rear-view or back-up camera, a side-view or a blind-spot camera, or a combination thereof. Also, for example, the visual sensor 214 can include an infrared sensor or a night vision sensor.

The visual sensor 214 can further include a camera on the first device 102 connected to and interacting with the vehicle 202. The visual sensor 214 can further include a cabin camera for detecting or determining visual information inside the vehicle or cabin of the vehicle.

The radar sensor 216 can include an object-detection system, device, or circuit. The radar sensor 216 can determine or identify an existence of an object or a target, such as an obstacle or another vehicle, external to the vehicle 202 a relative location or a distance between the object or the target and the vehicle 202, or a combination thereof.

The radar sensor 216 can utilize radio waves to determine or identify an existence of the object or the target, the relative location or a distance from the vehicle 202, or a combination thereof. For example, the radar sensor 216 can include a proximity sensor or warning system, such as for an area in front of, behind, adjacent to or on a side of, or a combination thereof geographically or physically relative to the vehicle 202.

The accessory sensor 218 can include a sensor for determining or detecting a status of a subsystem or a feature of the vehicle 202. The accessory sensor 218 can determine or detect the status or a setting for windshield wipers, turn signals, gear setting, headlights, or a combination thereof.

The volume sensor 220 can include a sensor for detecting or determining sounds for the vehicle 202. The volume sensor 220 can include a microphone for detecting or determining sounds within a cabin of the vehicle 202. The volume sensor 220 can further include a circuit for detecting or determining a volume level or an output level of speakers within the vehicle 202.

The vehicle 202 can use one or more of the environmental sensors 210 to generate the on-board diagnostics 222 describing or representing information regarding the environment within or surrounding the vehicle 202. The on-board diagnostics 222 can be further processed with the vehicle control circuit 206, stored in the vehicle storage circuit 208, communicated to another device through the vehicle control circuit 206, or a combination thereof.

The vehicle 202 can further include a user device or a mobile device illustrated in FIG. 1. For example, the vehicle 202 can include the first device 102.

As a more specific example, the vehicle communication circuit 204, the vehicle control circuit 206, the vehicle storage circuit 208, the environmental sensors 210, one or more interfaces, or a combination thereof can be included in or make up the first device 102 included in or integral with the vehicle 202. Also, as a more specific example, the vehicle 202 can include or be integral with the first device 102 including an embedded compute system, an infotainment system, a smart driving or a driver assistance system, a self-driving or a maneuvering system for the vehicle, or a combination thereof.

Figure 3:
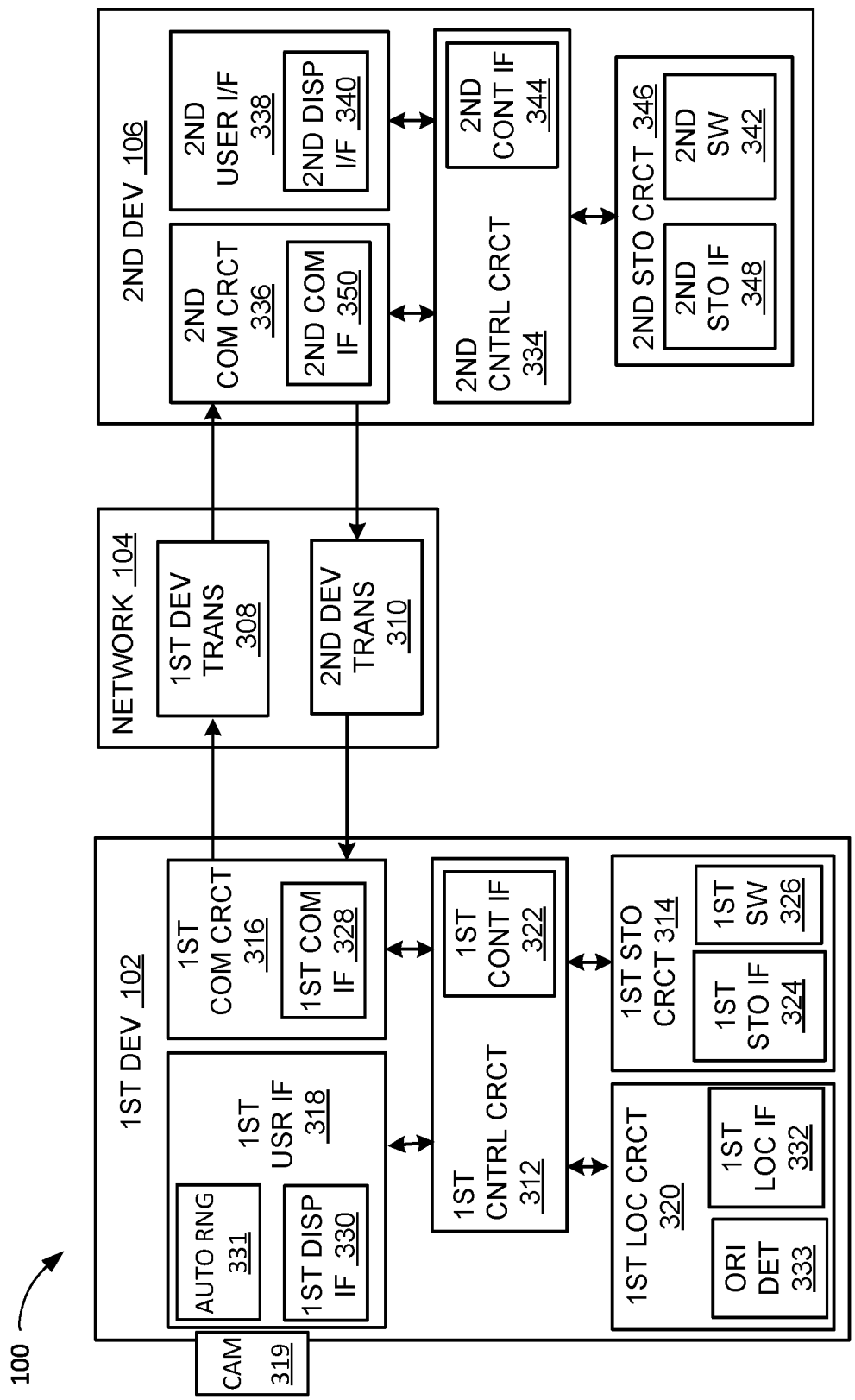
FIG. 3 is an exemplary block diagram of the compute system.

Referring now to FIG. 3, therein is shown an example of a block diagram of the compute system 100. The compute system 100 can include the first device 102, the communication path 104, and the second device 106. The first device 102 can send information in a first device transmission 308 over the communication path 104 to the second device 106. The second device 106 can send information in a second device transmission 310 of FIG. 3 over the communication path 104 to the first device 102.

For illustrative purposes, the compute system 100 is shown with the first device 102 as a client device, although it is understood that the compute system 100 can include the first device 102 as a different type of device. For example, the first device 102 can be a server including a display interface. Also, for example, the first device 102 can represent the vehicle 202 of FIG. 2.

Also, for illustrative purposes, the compute system 100 is shown with the second device 106 as a server, although it is understood that the compute system 100 can include the second device 106 as a different type of device. For example, the second device 106 can be a client device. Also, for example, the second device 106 can represent the vehicle 202.

Further, for illustrative purposes, the compute system 100 is shown with interaction between the first device 102 and the second device 106, although it is understood that the first device 102 can similarly interact with another instance of the first device 102. Similarly, the second device 106 can similarly interact with another instance of the second device 106.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 312, a first storage circuit 314, a first communication circuit 316, and a first user interface 318, and a first location circuit 320. The first control circuit 312 can include a first control interface 322. The first control circuit 312 can execute a first software 326 o to provide the intelligence of the compute system 100.

The circuits in the first device 102 can be the circuits discussed in the vehicle 202. For example, the first control circuit 312 can represent the vehicle control circuit 206 of FIG. 2 or vice versa. Also, for example, the first storage circuit 314 can represent the vehicle storage circuit 208 of FIG. 2 or vice versa. Further, for example, the first communication circuit 316 can represent the vehicle communication circuit 204 of FIG. 2 or vice versa.

The first control circuit 312 can be implemented in a number of different manners. For example, the first control circuit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control circuit 312 and other functional units or circuits in the first device 102. The first control interface 322 can also be used for communication that is external to the first device 102.

The first control interface 322 can receive information from the other functional units/circuits or from external sources, or can transmit information to the other functional units/circuits or to external destinations. The external sources and the external destinations refer to sources and destinations external to the first device 102.

The first control interface 322 can be implemented in different ways and can include different implementations depending on which functional units/circuits or external units/circuits are being interfaced with the first control interface 322. For example, the first control interface 322 can be implemented with a pressure sensor, an inertial sensor, a micro-electro-mechanical system (MEMS), optical circuitry, waveguides, wireless circuitry, wireline circuitry, or a combination thereof.

The first storage circuit 314 can store the first software 326. The first storage circuit 314 can also store the relevant information, such as data representing incoming images, data representing previously presented image, sound files, or a combination thereof.

The first storage circuit 314 can be a volatile memory, a nonvolatile memory, an internal memory, an external memory, or a combination thereof. For example, the first storage circuit 314 can be a nonvolatile storage such as non-volatile random access memory (NVRAM), Flash memory, disk storage, or a volatile storage such as static random access memory (SRAM).

The first storage circuit 314 can include a first storage interface 324. The first storage interface 324 can be used for communication between the first storage circuit 314 and other functional units or circuits in the first device 102. The first storage interface 324 can also be used for communication that is external to the first device 102.

The first storage interface 324 can receive information from the other functional units/circuits or from external sources, or can transmit information to the other functional units/circuits or to external destinations. The external sources and the external destinations refer to sources and destinations external to the first device 102.

The first storage interface 324 can include different implementations depending on which functional units/circuits or external units/circuits are being interfaced with the first storage circuit 314. The first storage interface 324 can be implemented with technologies and techniques similar to the implementation of the first control interface 322.

The first communication circuit 316 can enable external communication to and from the first device 102. For example, the first communication circuit 316 can permit the first device 102 to communicate with the second device 106 of FIG. 1, an attachment, such as a peripheral device or a desktop computer, and the communication path 104.

The first communication circuit 316 can also function as a communication hub allowing the first device 102 to function as part of the communication path 104 and not limited to be an end point or terminal circuit to the communication path 104. The first communication circuit 316 can include active and passive components, such as microelectronics or an antenna, for interaction with the communication path 104.

The first communication circuit 316 can include a first communication interface 328. The first communication interface 328 can be used for communication between the first communication circuit 316 and other functional units or circuits in the first device 102. The first communication interface 328 can receive information from the other functional units/circuits or can transmit information to the other functional units or circuits.

The first communication interface 328 can include different implementations depending on which functional units or circuits are being interfaced with the first communication circuit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, a camera 319, or any combination thereof to provide data and communication inputs.

The first user interface 318 can include a first display interface 330. The first display interface 330 can include an output device. The first display interface 330 can include a display, a projector, a video screen, a speaker, or any combination thereof. The first user interface 318 can also include an auto ranging module 331, which can include an autofocus function for a lens in the first user interface 318. By way of an example, the first device 102 can be a smartphone with imaging capabilities. The auto ranging module can be a hardware device capable of measuring the focal range between the first device 102 and a target subject, such as a tire mounted on the vehicle 202 of FIG. 2.

The first control circuit 312 can operate the first user interface 318 to display information generated by the compute system 100. The first control circuit 312 can also execute the first software 326 for the other functions of the compute system 100, including receiving location information from the first location circuit 320. The first location circuit 320 can also be or function as the location-movement sensor 213 of FIG. 2. The first control circuit 312 can further execute the first software 326 for interaction with the communication path 104 via the first communication circuit 316.

The first location circuit 320 can generate location information, current heading, current acceleration, and current speed of the first device 102, as examples. The first location circuit 320 can be implemented in many ways. For example, the first location circuit 320 can function as at least a part of the global positioning system, an inertial compute system, a cellular-tower location system, a pressure location system, or any combination thereof. Also, for example, the first location circuit 320 can utilize components such as an accelerometer or global positioning system (GPS) receiver.

The first location circuit 320 can include a first location interface 332. The first location interface 332 can be used for communication between the first location circuit 320 and other functional units or circuits in the first device 102. The first location interface 332 can also be used for communication external to the first device 102. The first location circuit 320 can include an orientation detector circuit 333, which can be a hardware circuit able to detect the orientation of the first device 102. The orientation detector circuit 333 can be a hardware circuit configured to identify an angle or orientation of the first device 102 relative to a horizontal plane above the Earth. The orientation detector circuit 333 can be pre-conditioned, with a target angle, to notify the first control circuit 312 when the orientation of the first device is at the target angle.

By way of an example, the orientation detector circuit 333 can be set-up to detect the first device at an angle of 30 degrees, in preparation for taking a picture. When the orientation detector circuit 333 determines that the first device 102 is at the pre-conditioned angle, the orientation detector circuit 333 can interrupt the first control circuit 312 in order to actuate the camera 319, including activating the auto ranging module 331, determining the range to the subject, performing an auto-focus, and capturing a picture of the subject. The first control circuit 312 can store the picture, the range, and the orientation angle in the first storage circuit 314 for further processing.

The first location interface 332 can receive information from the other functional units/circuits or from external sources, or can transmit information to the other functional units/circuits or to external destinations. The external sources and the external destinations refer to sources and destinations external to the first device 102.

The first location interface 332 can include different implementations depending on which functional units/circuits or external units/circuits are being interfaced with the first location circuit 320. The first location interface 332 can be implemented with technologies and techniques similar to the implementation of the first control circuit 312.

The second device 106 can be optimized for implementing an embodiment of the present invention in a multiple device embodiment with the first device 102. The second device 106 can provide the additional or higher performance processing power compared to the first device 102. The second device 106 can include a second control circuit 334, a second communication circuit 336, a second user interface 338, and a second storage circuit 346.

The second user interface 338 allows a user (not shown) to interface and interact with the second device 106. The second user interface 338 can include an input device and an output device. Examples of the input device of the second user interface 338 can include a keypad, a touchpad, softkeys, a keyboard, a microphone, or any combination thereof to provide data and communication inputs. Examples of the output device of the second user interface 338 can include a second display interface 340 of FIG. 3. The second display interface 340 can include a display, a projector, a video screen, a speaker, or any combination thereof.

The second control circuit 334 can execute a second software 342 of FIG. 3 to provide the intelligence of the second device 106 of the compute system 100. The second software 342 can operate in conjunction with the first software 326. The second control circuit 334 can provide additional performance compared to the first control circuit 312.

The second control circuit 334 can operate the second user interface 338 to display information. The second control circuit 334 can also execute the second software 342 for the other functions of the compute system 100, including operating the second communication circuit 336 to communicate with the first device 102 over the communication path 104.

The second control circuit 334 can be implemented in a number of different manners. For example, the second control circuit 334 can be a processor, an embedded processor, a microprocessor, hardware control logic, a hardware finite state machine (FSM), a digital signal processor (DSP), or a combination thereof.

The second control circuit 334 can include a second control interface 344 of FIG. 3. The second control interface 344 can be used for communication between the second control circuit 334 and other functional units or circuits in the second device 106. The second control interface 344 can also be used for communication that is external to the second device 106.

The second control interface 344 can receive information from the other functional units/circuits or from external sources, or can transmit information to the other functional units/circuits or to external destinations. The external sources and the external destinations refer to sources and destinations external to the second device 106.

The second control interface 344 can be implemented in different ways and can include different implementations depending on which functional units/circuits or external units/circuits are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

The second storage circuit 346 can store the second software 342. The second storage circuit 346 can also store the information such as data representing incoming images, data representing previously presented image, sound files, or a combination thereof. The second storage circuit 346 can be sized to provide the additional storage capacity to supplement the first storage circuit 314.

For illustrative purposes, the second storage circuit 346 is shown as a single element, although it is understood that the second storage circuit 346 can be a distribution of storage elements. Also, for illustrative purposes, the compute system 100 is shown with the second storage circuit 346 as a single hierarchy storage system, although it is understood that the compute system 100 can include the second storage circuit 346 in a different configuration. For example, the second storage circuit 346 can be formed with different storage technologies forming a memory hierarchal system including different levels of caching, main memory, rotating media, or off-line storage.

The second storage circuit 346 can be a volatile memory, a nonvolatile memory, an internal memory, an external memory, or a combination thereof. For example, the second storage circuit 346 can be a nonvolatile storage such as non-volatile random access memory (NVRAM), Flash memory, disk storage, or a volatile storage such as static random access memory (SRAM).

The second storage circuit 346 can include a second storage interface 348. The second storage interface 348 can be used for communication between the second storage circuit 346 and other functional units or circuits in the second device 106. The second storage interface 348 can also be used for communication that is external to the second device 106.

The second storage interface 348 can receive information from the other functional units/circuits or from external sources, or can transmit information to the other functional units/circuits or to external destinations. The external sources and the external destinations refer to sources and destinations external to the second device 106.

The second storage interface 348 can include different implementations depending on which functional units/circuits or external units/circuits are being interfaced with the second storage circuit 346. The second storage interface 348 can be implemented with technologies and techniques similar to the implementation of the second control interface 344.

The second communication circuit 336 can enable external communication to and from the second device 106. For example, the second communication circuit 336 can permit the second device 106 to communicate with the first device 102 over the communication path 104.

The second communication circuit 336 can also function as a communication hub allowing the second device 106 to function as part of the communication path 104 and not limited to be an end point or terminal unit or circuit to the communication path 104. The second communication circuit 336 can include active and passive components, such as microelectronics or an antenna, for interaction with the communication path 104.

The second communication circuit 336 can include a second communication interface 350. The second communication interface 350 can be used for communication between the second communication circuit 336 and other functional units or circuits in the second device 106. The second communication interface 350 can receive information from the other functional units/circuits or can transmit information to the other functional units or circuits.

The second communication interface 350 can include different implementations depending on which functional units or circuits are being interfaced with the second communication circuit 336. The second communication interface 350 can be implemented with technologies and techniques similar to the implementation of the second control interface 344.

The first communication circuit 316 can couple with the communication path 104 to send information to the second device 106 in the first device transmission 308. The second device 106 can receive information in the second communication circuit 336 from the first device transmission 308 of the communication path 104.

The second communication circuit 336 can couple with the communication path 104 to send information to the first device 102 in the second device transmission 310. The first device 102 can receive information in the first communication circuit 316 from the second device transmission 310 of the communication path 104. The compute system 100 can be executed by the first control circuit 312, the second control circuit 334, or a combination thereof. For illustrative purposes, the second device 106 is shown with the partition containing the second user interface 338, the second storage circuit 346, the second control circuit 334, and the second communication circuit 336, although it is understood that the second device 106 can include a different partition. For example, the second software 342 can be partitioned differently such that some or all of its function can be in the second control circuit 334 and the second communication circuit 336. Also, the second device 106 can include other functional units or circuits not shown in FIG. 3 for clarity.

The functional units or circuits in the first device 102 can work individually and independently of the other functional units or circuits. The first device 102 can work individually and independently from the second device 106 and the communication path 104.

The functional units or circuits in the second device 106 can work individually and independently of the other functional units or circuits. The second device 106 can work individually and independently from the first device 102 and the communication path 104.

The functional units or circuits described above can be implemented in hardware. For example, one or more of the functional units or circuits can be implemented using circuitry, a processor, a computer, integrated circuit, integrated circuit cores, a pressure sensor, an inertial sensor, a micro-electro-mechanical system (MEMS), a passive device, a physical non-transitory memory medium containing instructions for performing the software function, a portion therein, or a combination thereof.

For illustrative purposes, the compute system 100 is described by operation of the first device 102 and the second device 106. It is understood that the first device 102 and the second device 106 can operate any of the modules and functions of the compute system 100. By way of an example, the first device 102 can analyze the output of the camera 319 based on the auto ranging module 331 and first control circuit 312. The first device 102 can identify issues with the wear or foreign object damage in a tire.

Figure 4:
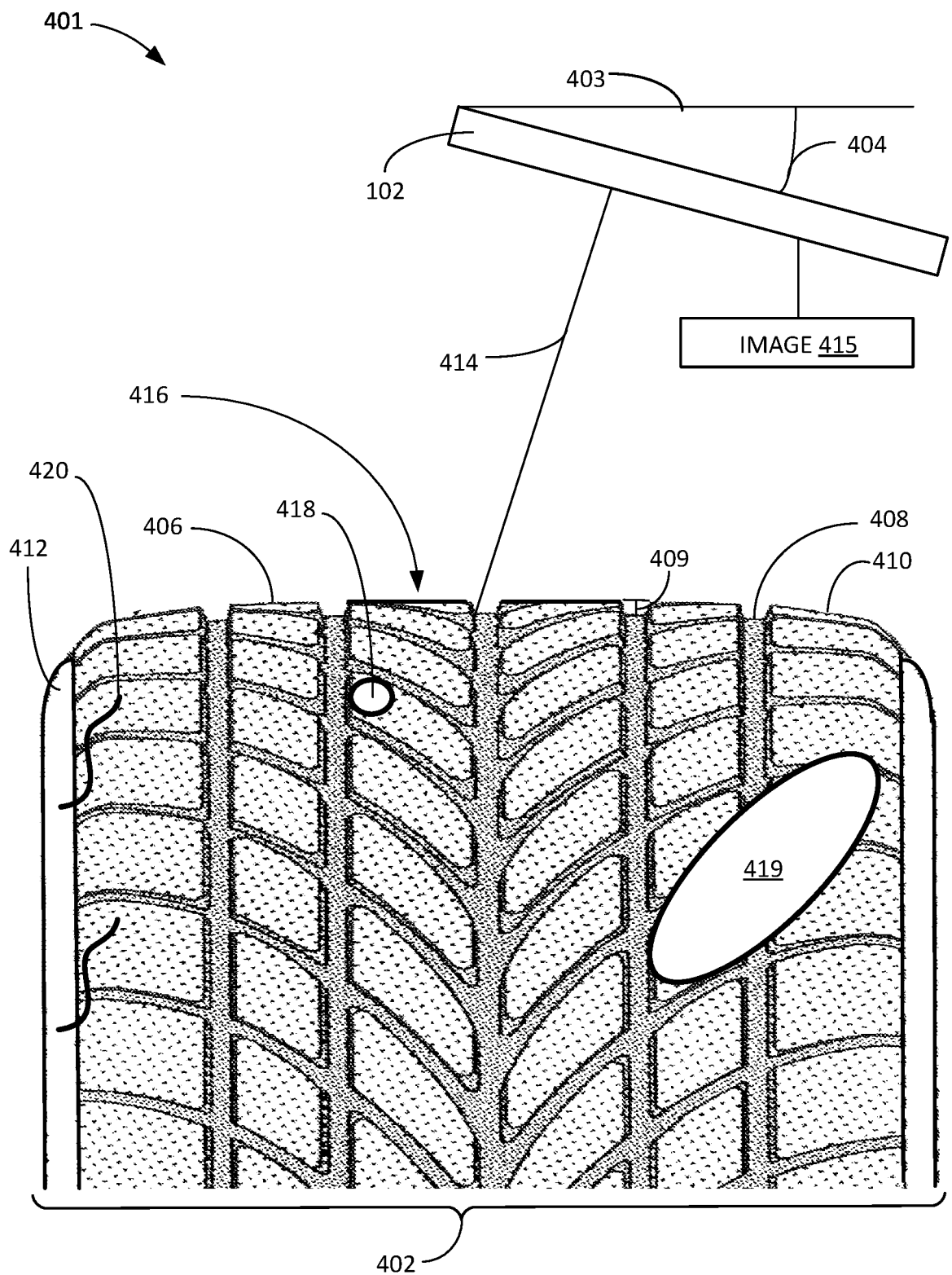
FIG. 4 is an example of a wear detection mechanism as applied to a tire of the vehicle of FIG. 2.

Referring now to FIG. 4, therein is shown an example of a wear detection mechanism 401 as applied to a tire 402 of the vehicle 202 of FIG. 2. The wear detection mechanism 401 can include the first device 102 positioned above the tire 402 at a pre-conditioned angle 404. The first device 102 can be positioned to identify a tread height 409 measured as a difference between a tire tread 406 and a tire groove 408. Also, for example, the wear detection mechanism 401 can include identification of low tread 417, tire wear 419, cracks 420 in the tire tread 406, the presence of a foreign object 418, or a combination thereof. The foreign object 418 can include nails or screws, metal chards, small tools, or a combination thereof protruding from the tire 402. The low tread 417 can be defined as an area in the tire tread 406 with 70% to 80% of the tread height 409 worn away. By way of an example, the remainder of the tread height 409 can be in the range of $4/32$ to $3/32$ of an inch.

The first device 102 can be used to capture an image 415 the surface 416 of the tire 402 including the tire tread 406 and the groove 408. The surface 416 that is analyzed is the tire tread 406, the grooves 408, and the shoulder 410 on either side of the tire 402. Typically, the image 415 is taken for each wheel while it is on the vehicle 202. It is understood that as the vehicle 202 is driven, tire wear 417 on the tire 402 can reduce the tread height 409 measured as the difference between the tire tread 406 and the groove 408. The compute system 100 of FIG. 1 can capture the image 415, the distance between the first device 102 and the tire 402 and the pre-conditioned angle 404 for transfer to the second device 106 of FIG. 1 for analysis of the tire wear 417 experienced by the tire 402. The tire wear 417 can be defined as an area, a zone, or a portion of the tire 402, in which the tire tread 406 is excessively worn to reduce the tread height 409 of the tire tread 406 above the groove 408

In an example embodiment, the first device 102 can perform the analysis without the involvement of the second device 106. It is understood that the pre-conditioned angle 404 can allow the first device 102 to calculate the tread height 409 of the tire tread 406 by presenting a clear view into the base of the groove 408. Also, for example, the first device 102 can provide an alignment pattern to position the camera 319 of FIG. 3 at a fixed distance from the tire 402 for establishing the pre-conditioned angle 404. The first control circuit 312 of FIG. 3 can measure the tread height 409 of the tire tread 406 above the groove 408 by counting pixels displayed by the camera 319.

The first device 102 can be positioned at the pre-conditioned angle 404 in order to have a clear view of the tread height 409 difference between the tire tread 406 and the groove 408. From this position, approximately half of the tire 402 can be analyzed for wear. Since the pattern of wear can be caused by several different phenomenon, the second device can characterize the wear patterns in order to identify the probable cause of the wear.

The first device 102 can also view a shoulder 410 of the tire 402 and a sidewall 412 of the tire 402. Wear of the tire 402 can be caused by incorrect air pressure in the tire 402, improper alignment of the tire 402, improper balance of the tire 402, damage to the tire 402 caused by impact with external structures, or a combination thereof. By analyzing the wear pattern, the second device 106 can identify a category of the cause of the wear and make recommendations for corrective action including displaying the wear pattern and possible cause in the vehicle display 212 of FIG. 2. The first device 102 can identify a foreign object 418 in the tire 402. The foreign object 418 can be a nail, a screw, chard of metal or glass, or the like. In some instances, the first device 102 can detect cracks 420, which can develop in the shoulder 410 or the sidewall 412 of the tire 402. The cracks 420 can be caused by manufacturing defects, extreme heat, dry environmental conditions, or a combination thereof. By detecting the foreign object 418 or the cracks 420 in the tire 402, the wear detection mechanism 401 can alert the user of the first device 102 before a collapse of the tire 402 can occur.

It has been discovered that the orientation detection circuit 333 of FIG. 3 can be loaded with the pre-conditioned angle 404 in order to provide a line-of-sight 414 to the groove 408 and the tire tread 406. Given the pre-conditioned angle 404 and the output of the auto ranging module 331 of FIG. 3, the first device 102 or the second device 106 can calculate the tread height 409 of the tire tread 406 above the groove 408. By analyzing the viewable portion of the tire 402, a determination of the general condition of the tire 402 can be made. The first device 102 can be held over the tire 402 in a horizontal orientation 403 and slowly rotated toward the pre-conditioned angle 404. When the orientation detector circuit 333 of FIG. 3 determines that the first device 102 reaches the pre-conditioned angle 404, the first control circuit 312 can adjust the auto ranging module 331 and capture the image 415 of the surface 416 of the tire 402. By measuring the difference in tread height 409 between the tire tread 406 and the groove 408, a wear assessment can be provided on the vehicle display 212.

Figure 5:
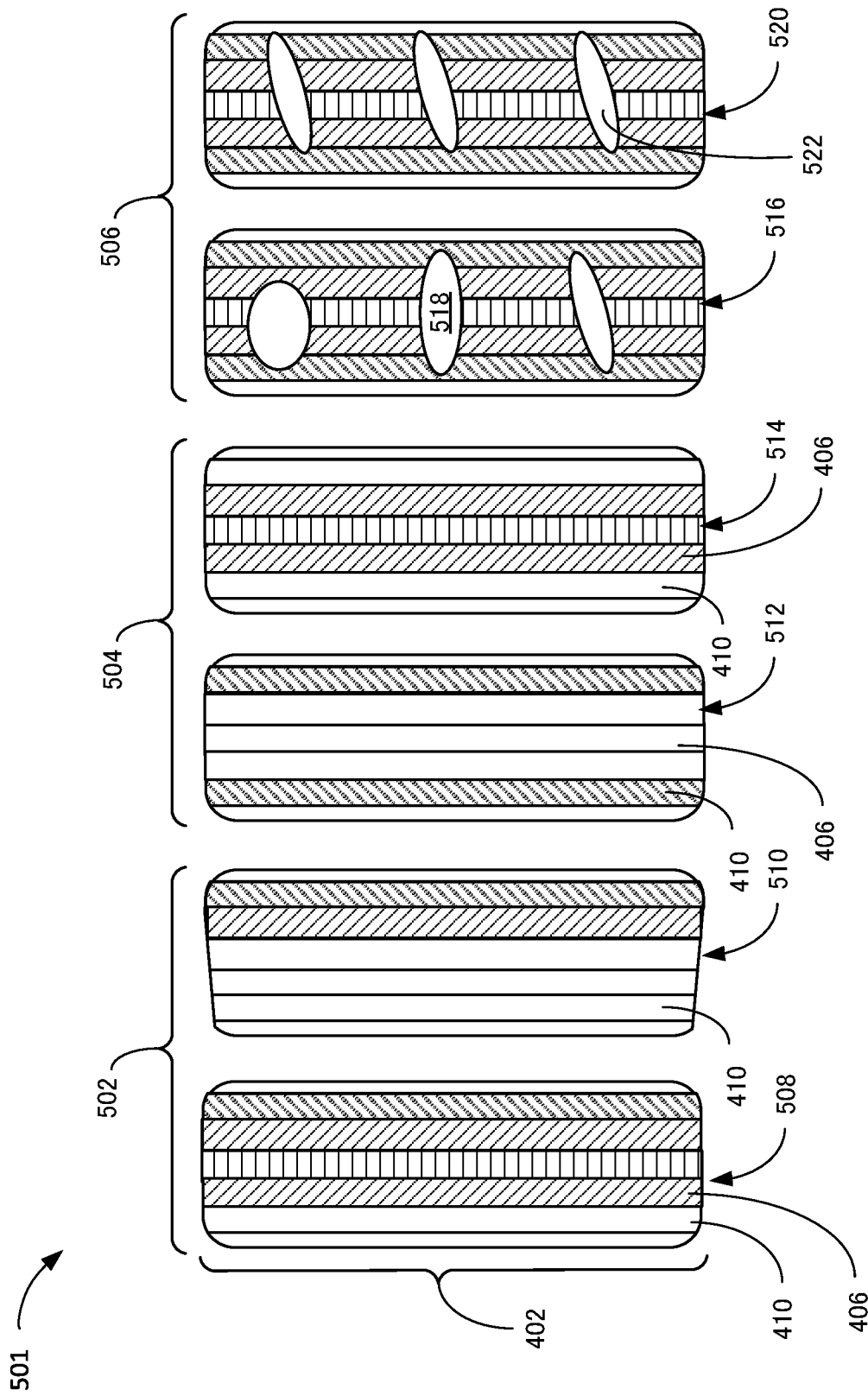
FIG. 5 is an example of tire wear compiled by the wear detection mechanism.

Referring now to FIG. 5, therein is shown example the images 415 of tire wear patterns 501 compiled by the wear detection mechanism 401. The example of the tire wear patterns 501 can include an alignment group 502, an inflation group 504, and a damaged group 506. Each of the tire wear patterns 501 can identify a likely cause of the excessive wear of the tire 402. The tire wear patterns 501 can be analyzed by the first device 102 of FIG. 1 or the second device 106 of FIG. 1 utilizing artificial intelligence techniques to monitor the progression of the tire wear patterns 501. FIG. 5 shows the tire wear patterns 501 as areas without fill patterns. This is intended to show areas of wear rather than actual wear of the tire 402.

By early detection of the tire wear patterns 501, the vehicle 202 of FIG. 2 can be warned of mechanical conditions that can adversely impact the reliability and availability. The different type of the tire wear patterns 501 can be analyzed to provide early warnings to the operator of the vehicle 202 through the vehicle display 212 of FIG. 2.

The identification of the tire wear patterns 501 in the alignment group 502 can detect wear in the shoulder 410 of the tire 402. The premature wearing of the shoulder 410, where the rest of the tread is lightly worn or not worn at all, can be indicative of a wheel alignment problem known as toe wear 508. The wear can occur on either of the inner or outer instances of the shoulder 410. The toe wear 508 of the wheel is defined as the linear tracking of the tire 402 in the direction the vehicle 202 is traveling. If the alignment of the tire 402 is just a couple of degrees offset from the direction of the vehicle 202, the shoulder 410 will wear more rapidly than the rest of the tire tread 406. In this situation, the vehicle display 212 could alert the operator of the vehicle 202 that the alignment should be checked to prevent additional wear of the tire 402. The toe wear 508 can be an indication that the tie-rod might need adjustment or repair.

Also, in the alignment group 502, a wheel alignment problem known as camber wear 510 can start with the wearing of the shoulder 410, but adjacent tread 406 is also worn. This condition can be caused by the wheel suspension not holding the tire 402 in a vertical direction (relative to the Earth). The direction of displacement from vertical will cause only a portion of the tire to carry the load of the vehicle 202. This condition causes the shoulder 410 and the tire tread 406 on one side of the tire 402 to wear very quickly. This condition is indicated by heavy wear on one side of the tire 402, while the opposite side shows only light wear. The camber wear 510 is an indication that a suspension component has been damaged by hitting an object, such as a pot hole, a curb, large road debris, or the like. The damage can cause the tire 402 to lean out of the vertical position and over stress only a portion of the tire 402. If this condition is not addressed, the tire 402 will be destroyed and the control of the vehicle 202 can be impaired. When the camber wear 510 is detected, the vehicle display 212 can indicate that action must be taken to prevent further damage or loss of control of the vehicle 202.

The inflation group 504 can be addressed by monitoring the proper inflation of the tire 402 on the vehicle 202. While most people do not pay attention to the proper inflation of their tire 402, the vehicle 202 can monitor the tire pressure but cannot determine the degree of wear that the incorrect pressure can cause. By way of an example, an over-inflated wear 512 can be detected by identifying wear of the tire tread 406 between the shoulders 410. The over-inflation of the tire 402 causes it to have a rounded shape between the shoulders 410. Since the tire tread 406 can protrude beyond the tread height 409 of the shoulder 410, the tire tread 406 can be worn-out before the shoulder 410 actually contacts the road. This situation can cause handling problems and makes the tire 402 susceptible to puncture.

In a related issue, an under-inflated wear 514 can be detected by wear on both of the shoulder 410 with less wear on the tire tread 406 that is between the shoulders 410. This condition can also cause handling issues and impaired braking because the center area of the tire tread 406 has reduced contact as the majority of the contact pressure is on the shoulder 410. While the inflation group 504 is the easiest to correct, these issues don't usually get the attention they need until the tire 402 fails or is severely damaged. By monitoring with the compute system 100 of FIG. 1, the efficiency of the vehicle 202 and the longevity of the tire 402 can be protected.

The compute system 100 can also identify the damaged group 506. The damaged group 506 can indicate that there is a mechanical issue with the wheel or suspension of the vehicle 202. By way of an example, a wheel out of balance wear 516 can be detected by seemingly random bald regions 518, such as flat spots or cupped regions in the tire tread 406. This can be caused when a balance weight breaks free of the wheel that is mounting the tire 402. When the tire is rotating at speed, the tire will bounce on the road rather than rolling on it. The bouncing applies additional stress on the tire tread 406 and can make the vehicle 202 difficult to control and can induce damage in the suspension of the vehicle 202. The compute system 100 can monitor progression of the tire wear patterns 501 in order to provide a message for presentation on the vehicle display 212 before the tire is severely worn or any control issues might occur.

The damaged group 506 includes a suspension damaged wear 520. The suspension damaged wear 520 is characterized by suspension wear 522, such as worn or cupped patches that appear evenly spaced an in a generally diagonal orientation across the tire tread 406. When there is a cupped surface 416 on the tire 402, the tire tread 406 can have semi-circular divots in the tire tread 406. This condition can be caused by bent or broken suspension components, such as shock absorbers or struts. It is understood that the suspension damaged wear 520 can be a precursor to the failure of the damaged suspension components. By periodically imaging the tire 402, the compute system 100 can prevent an unexpected loss of control of the vehicle 202. The vehicle display 212 can show the tire 402 with the worn areas high-lighted for easier detection. The compute system 100 can provide analysis and a recommended action to correct the tire wear patterns 501 for the vehicle 202.

It has been discovered that the compute system 100 can use the first device 102 to capture the image 415 of the surface 416 of the tire 402. By using artificial intelligence (AI) techniques to learn the damaged areas of the tire 402 or the tire tread 406 and present the findings on the vehicle display 212 with the wear patterns high-lighted for quick recognition. The vehicle display 212 can offer corrective action suggestions to address the tire wear patterns 501. The analysis of the image 415 of the surface 416 of the tire 402 can be analyzed by the first device 102, the second device 106, the vehicle control circuit 206, or a combination thereof. By providing identification of the tire wear patterns 501 and a suggested corrective action, the compute system 100 can extend the operational life of the vehicle 202 extend the useful life of the tire 402, prevent unexpected failure of the suspension components, or a combination thereof.

Figure 6:
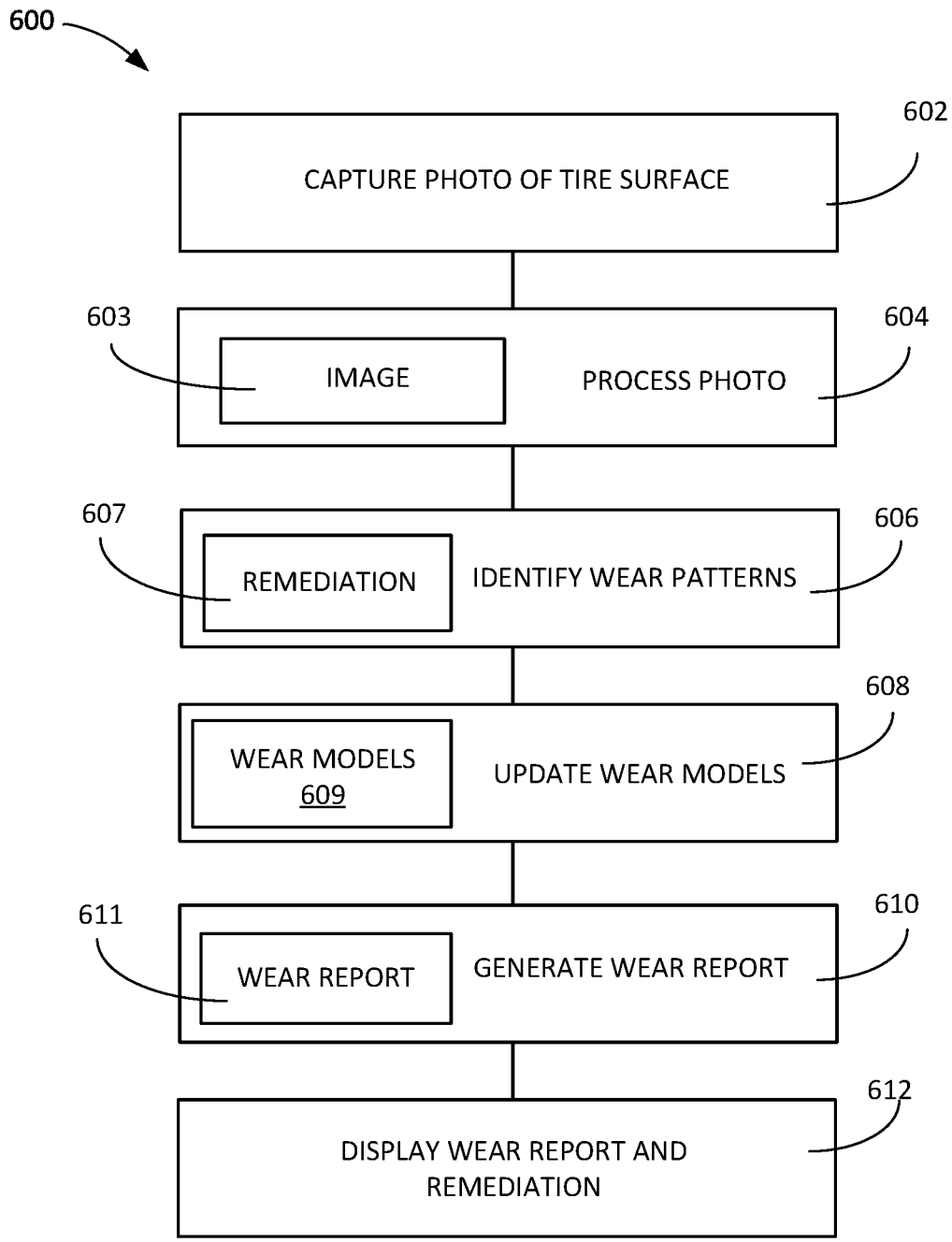
FIG. 6 is an example of a control flow of the compute system.

Referring now to FIG. 6, therein is shown a control flow 600 of the compute system 100. The control flow in FIG. 6 depicts and describes an example of the operation of a wear detection mechanism by the compute system 100.

The operation of the wear detection mechanism starts with capturing the image 415 of a tire surface module 602. In this step, the first device 102 of FIG. 1 can be positioned over the tire 402 of FIG. 4. The first device 102 can be loaded with the pre-conditioned angle 404 of FIG. 4 that establish the proper angle of view to capture the full tread height 409 of FIG. 4 of the tire tread 406 of FIG. 4. With the first device 102 positioned over the tire 402 and held in the horizontal orientation 403, the first device can be rotated away from the horizontal orientation 403. When the first device 102 reaches the pre-conditioned angle 404, the first device 102 can activate the auto ranging module 331 in order to auto focus the camera 319 of the first device 102 and measure the distance of the line-of-sight 414 to the groove 408 of FIG. 4 of the tire 402. The first device 102 can then capture an image 603 of the tire 402.

The flow proceeds to a process image module 604. The processing of the photo can be performed by the first device 102, the second device 106, the vehicle 202, or a combination thereof. The image 603 can reflect one or more of the tire wear patterns 501 of FIG. 5. The control circuit 312 can compare the image 603 captured with any previous versions of the image 603 of the same one of the tire 402, with tread depth specifications for a new one of the tire 402, in order to calculate the remaining depth of the tire tread 406. Any areas of the tire wear patterns 501 can be high-lighted in the image 603 for easier identification. If no previous information about the depth of the tire tread 406 is available, the control circuit 312 of FIG. 3 can compare the tread height 409 of the tire tread 406 across the surface 416 of the tire 402. Any discontinuities in the depth of the tire tread 406 can be seen as wear and high-lighted for future analysis. The image 603 can be archived in the storage circuit 314 of FIG. 3.

The flow proceeds to an identify wear patterns module 606. The control circuit 312 of the first device 102, the second device 106, or the vehicle 202 can compare any previous version of the image 603 of the same one of the tire 402 in order to identify the tire wear patterns 501. If no previous version of the image 603 is available, the control circuit 312 can rely on learned wear patterns that were previously loaded in the storage circuit 314. Once the areas of the tire wear patterns 501 have been identified, the control circuit 312 can match the tire wear patterns 501 to a category, such as the alignment group 502, the inflation group 504, the damaged group 506, or a combination thereof. The identification of the category of the tire wear patterns 501 can provide remediation 607 for the identified category, which can range from adjusting the air pressure of the tire 402 to replacing worn or damaged parts in the vehicle 202. The options for the remediation 607 can be provided as a look-up table or a linked list.

The flow proceeds to an update wear models module 608. The update wear models module 608 can save the identified ones of the tire wear patterns 501 for the tire 402 currently under analysis. The updating of the wear models 609 can provide a learning process to shorten the amount of time required to execute the identify wear patterns module 606. It is understood that as the compute system 100 gains experience with a specific one of the tire 402, the analysis of the tire wear patterns 501 can be more efficient, and a more detailed version of the remediation 607 can be provided.

The flow proceeds to a generate wear report module 610. The control circuit 312 can collect the high-lighted version of the image 603 of the tire 402, the identified category of the tire wear patterns 501, and a list of the remediation 607 to possibly address the issues that were detected. This information can be configured for presentation on the vehicle display 212 of FIG. 2. The generate wear report module 610 can also transmit the content of a wear report 611 to the second device 106 for archival and further analysis of the regional tendencies of the tire wear patterns 501 from a specific region or a specific manufacturer of the tire 402.

The flow proceeds to a display wear report and remediation module 612. The control circuit 312 can notify the operator of the vehicle 202 that the wear report 611 is available for viewing on the vehicle display 212. If the wear report 611 has no urgent information or issues identified, the wear report 611 can be loaded straight to the second device 106 for archival and further analysis. It is understood that the wear report 611 can be displayed on the first device 102, the second device 106, the vehicle, or a combination thereof.

It has been discovered that the compute system 100 can provide early analysis of the condition of the tires and suspension of the vehicle 202. By capturing the image 603 of the surface 416 of the tire 402, the control circuit 312 can also measure the distance between the first device 102 and the tire 402. With this information, the control circuit 312 can calculate the tread height 409 of the tire tread 406 in order to identify the tire wear patterns 501. The process of identifying the tire wear patterns 501 can be distributed among the first device 102, the second device 106 and the vehicle 202, based on the compute resource required. The wear report 611 can include the image 603, with high-lighted areas showing the tire wear patterns 501, the category of the tire wear, and a list of steps for the remediation 607 to analyze and mitigate any dangerous conditions. The use of the compute system 100 can improve the useable life of the tire 402 and maintain the safety and reliability of the vehicle 202.

Figure 7:
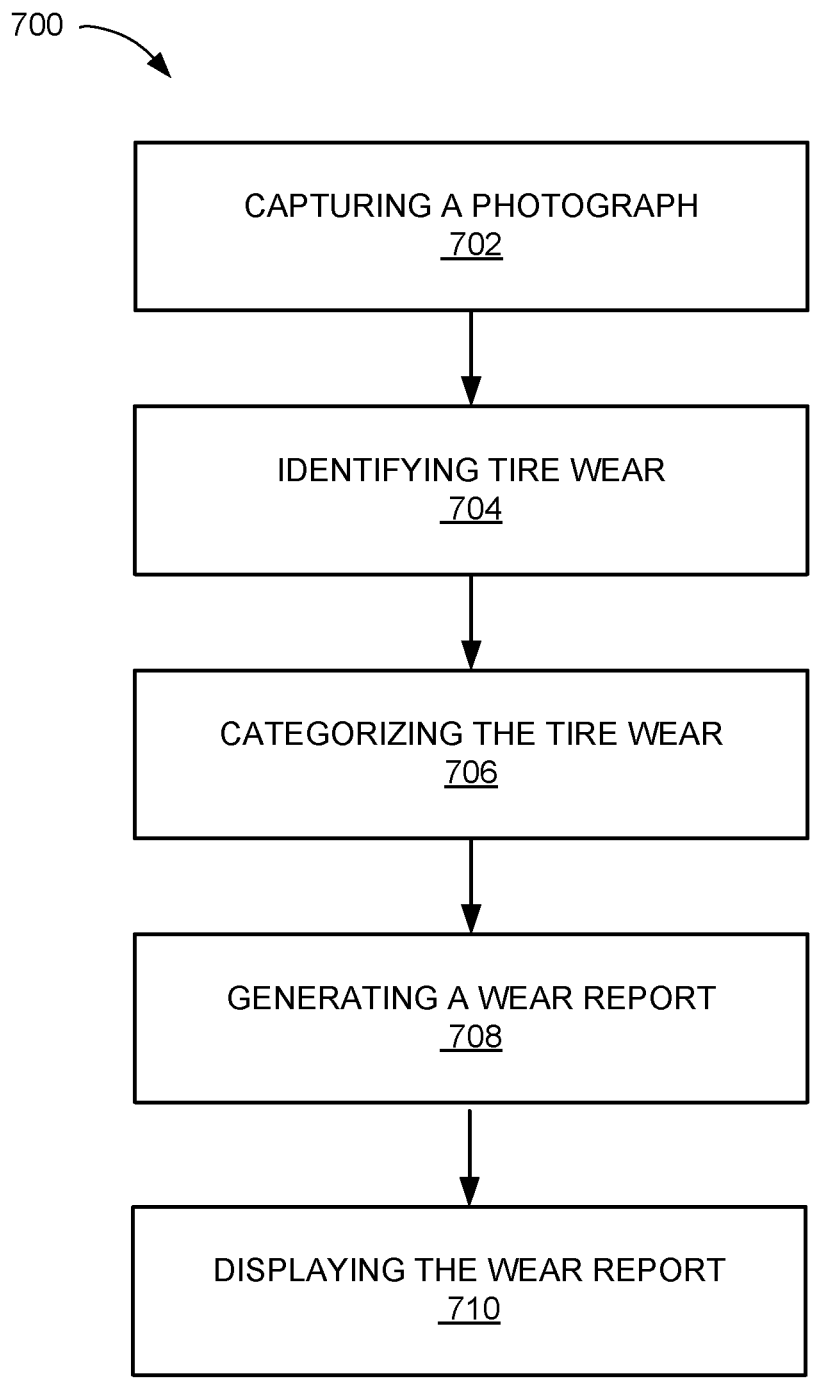
FIG. 7 is a flow chart of a method of operation of a compute system in an embodiment of the present invention.

Referring now to FIG. 7, therein is shown a flow chart of a method 700 of operation of a compute system 100 in an embodiment of the present invention. The method 700 includes: capturing an image of a surface of a tire in a box 702; identifying a tire wear in the image in a box 704; categorizing the tire wear as a bald region, a crack, a foreign object, low tread, or a combination thereof in a box 706;

generating a wear report includes identifying the tire wear as the bald region, the crack, the foreign object, or the combination thereof in a box 708; and displaying the wear report on a display in a box 710.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation for a compute system comprising:
    capturing an image of a surface of a tire;
    identifying a tire wear in the image including identifying a tire wear pattern, across the tire, as the tire wear by analyzing the surface of the tire;
    categorizing the tire wear as a bald region, a crack, a foreign object, low tread, or a combination thereof;
    identifying a cause of the tire wear from among a toe wear, a camber wear, and suspension damage wear;
    identifying the cause of the tire wear to be an over-inflated wear or an under-inflated wear;
    detecting the cause of the tire wear to be wheel out of balance wear;
    generating a wear report includes identifying the tire wear as the bald region, the crack, the foreign object, low tread, or the combination thereof including comparing the trend in level of wear with previous versions of the tire wear and identifying the cause; and
    transferring the wear report for displaying on a display.

2. The method as claimed in claim 1 further comprising analyzing the image includes measuring a line-of-sight to the tire and calculating a tread height including identifying the tire wear pattern as an alignment group, an inflation group, a damage group, or a combination thereof based on the detection of the bald region, the crack, the foreign object, or the combination thereof.

3. The method as claimed in claim 1 wherein capturing the image includes:
    positioning a device over the tire in a horizontal orientation;
    rotating the device until a pre-conditioned angle is met; and
    activating a camera when the pre-conditioned angle is met.

4. The method as claimed in claim 1 further comprising identifying a remediation for an alignment group, an inflation group, a damaged group, or a combination thereof included in the wear report.

5. The method as claimed in claim 1 wherein generating the wear report includes high-lighting the tire wear on the image of the tire.

6. The method as claimed in claim 1 wherein capturing the image includes positioning a camera on a line-of-sight at a pre-conditioned angle.

7. The method as claimed in claim 1 wherein displaying the wear report includes the wear report presented on a vehicle display.

8. A compute system comprising:
    a control circuit configured to:
        capture an image of a surface of a tire,
        identify a tire wear in the image including identifying a tire wear pattern, across the tire, as the tire wear by analyzing the surface of the tire,
        categorize the tire wear as a bald region, a crack, a foreign object, low tread, or a combination thereof,
        identify a cause of the tire wear from among a toe wear, a camber wear, and suspension damage wear,
        identifying the cause of the tire wear to be an over-inflated wear or an under-inflated wear;
        determine the cause of the tire wear to be wheel out of balance wear, and
        generate a wear report to identify the tire wear as the bald region, the crack, the foreign object, low tread, or the combination thereof includes previous versions of the tire wear compared for a trend in level of wear and the cause identified; and
    a communication circuit, coupled to the control circuit, configured to transfer the wear report for presentation on a display.

9. The system as claimed in claim 8 further comprising the control circuit coupled to an auto ranging module configured to:
    measure a line-of-sight to the tire to capture the image;
    calculate a tread height based on the line-of-sight and a predetermined angle; and
    identify the tire wear pattern as an alignment group, an inflation group, a damage group, or a combination thereof based on the detection of the bald region, the crack, the foreign object, or the combination thereof.

10. The system 100) as claimed in claim 8 wherein the control circuit is further configured to:
    detect a horizontal orientation;
    detect rotation to a pre-configured angle; and
    activate a camera when the pre-configured angle is met.

11. The system as claimed in claim 8 wherein the control circuit is further configured to identify a remediation for an alignment group, an inflation group, a damaged group, or a combination thereof.

12. The system as claimed in claim 8 wherein the control circuit is further configured to high-light the tire wear on the image of the tire.

13. The system as claimed in claim 8 wherein the control circuit is further configured to detect a camera on a line-of-sight and tilted to the pre-conditioned angle.

14. The system as claimed in claim 8 wherein the communication circuit, is configured to transfer the wear report to a vehicle for display on the vehicle display.

15. A non-transitory computer readable medium including instructions executable by a control circuit for a compute system comprising:
    capturing an image of a surface of a tire;
    identifying a tire wear in the image including identifying a tire wear pattern, across the tire, as the tire wear by analyzing the surface of the tire;

categorizing the tire wear as a bald region, a crack, a foreign object, low tread, or a combination thereof;

identifying a cause of the tire wear from among a toe wear, a camber wear, and suspension damage wear;

identifying the cause of the tire wear to be an over-inflated wear or an under-inflated wear;

determining the cause of the tire wear to be wheel out of balance wear;

generating a wear report includes identifying the tire wear, as the bald region, the crack, the foreign object, low tread, or the combination thereof including comparing the trend in level of wear with previous versions of the tire wear and identifying the cause; and transferring the wear report for displaying on a display.

16. The non-transitory computer readable medium as claimed in claim 15 wherein capturing the image includes:

positioning a device over the tire in a horizontal orientation;

rotating the device until a pre-conditioned angle is met; and activating a camera when the pre-conditioned angle is met.

17. The non-transitory computer readable medium as claimed in claim 15 further comprising identifying a remediation for an alignment group, an inflation group, a damaged group, or a combination thereof included in the wear report.

18. The non-transitory computer readable medium as claimed in claim 15 wherein generating the wear report includes high-lighting the tire wear on the image of the tire.

19. The non-transitory computer readable medium as claimed in claim 15 wherein capturing the image includes positioning a camera on a line-of-sight at a pre-conditioned angle.

20. The non-transitory computer readable medium as claimed in claim 15 wherein displaying the wear report includes the wear report presented on a vehicle display.

* * * * *